(Specimens.)
P. R. BRADLEY.
COMPOSITION FABRIC.
No. 453,689. Patented June 9, 1891.
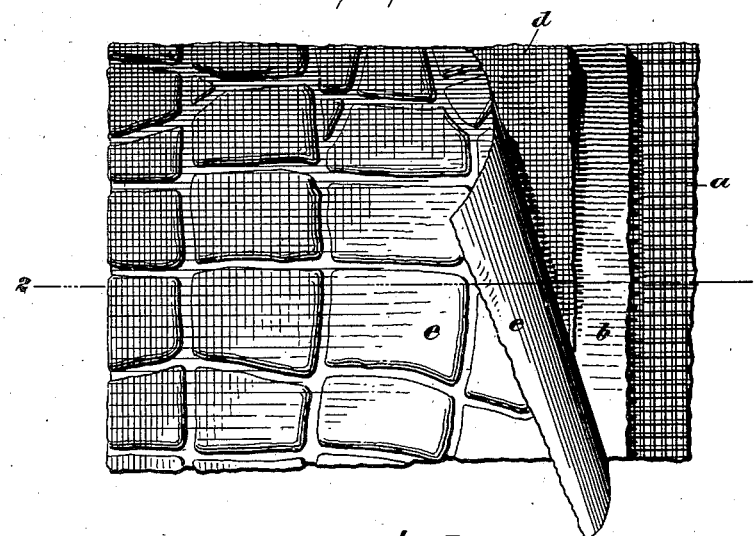
WITNESSES:
INVENTOR
Parker R. Bradley
BY Briesen & Knauth
his ATTORNEYS

UNITED STATES PATENT OFFICE.

PARKER RICHARDSON BRADLEY, OF BOSTON, MASSACHUSETTS, ASSIGNOR TO THE PANTASOTE LEATHER COMPANY, OF PASSAIC, NEW JERSEY.

COMPOSITION FABRIC.

SPECIFICATION forming part of Letters Patent No. 453,689, dated June 9, 1891.

Application filed January 29, 1891. Serial No. 379,499. (Specimens.)

*To all whom it may concern:*

Be it known that I, PARKER RICHARDSON BRADLEY, a resident of Boston, county of Suffolk, and State of Massachusetts, have invented a new and useful Improvement in Composition Fabrics, of which the following is a complete specification.

My invention relates to a composition fabric which is embossed in imitation of leather or otherwise.

The object of my invention is to build up a composition fabric in such a manner that the surface may be suitably embossed and cannot afterward be stretched out to obliterate the embossed design.

My invention is fully illustrated by the accompanying drawings, in which—

Figure 1 shows a face view of a portion of my fabric having an embossed surface and showing the several layers which form the combination. Fig. 2 is a cross-section on the plane of the line 2 2, Fig. 1; and Fig. 3 is a cross-section of a modification of my improved fabric.

Similar letters refer to similar parts in all the figures.

My improved fabric consists of four thicknesses $a$, $b$, $d$, and $e$. The lower of these $a$ is of stout cloth, preferably heavy and coarsely woven. Upon this foundation-cloth $a$ is spread a layer $b$ of gum composition. This composition may be any well-known gum compound used for making imitation leather, or it may be unvulcanized india-rubber, gutta-percha, or the like. The gum $b$ is spread in quite a considerable thickness while in a plastic state over the cloth $a$, much more so than would be necessary if it were merely to be used for uniting two fabrics. Upon the surface of this composition $b$ is laid another layer of cloth, this cloth being preferably much more closely woven and much finer than the cloth layer $a$. Upon the cloth $d$ is spread another very thin layer of gum composition $e$, which will hide the grain of said layer of cloth $d$. The fabric thus far explained is next embossed by a suitable embossing-tool, which, owing to the softness and comparatively greater thickness of the layer $b$ of gum, produces its impression in the upper layers $e\ d\ b$, while the lower layer $a$ remains substantially flat. It will be seen that owing to the thick layer of gum $b$ the stretching out of the embossing is prevented, and that the indentations in the upper layers will be clearly preserved, thereby giving a permanency to the embossed exterior surface.

The fabric produced according to my design will have the appearance of natural leather and will be water-proof, but cannot be stretched out of shape, and hence will be very durable.

Having now described my invention, what I claim is—

As a new article of manufacture, the embossed composition fabric herein described, the same consisting of the bottom sheet $a$ of fabric, the layer $b$ of gum composition placed upon said fabric, said layer being sufficiently heavy to take up the embossed design of the fabric $d$ that is placed upon said composition layer $b$ before the same was embossed, and the uppermost coating $e$ of gum composition, all arranged to have the embossing mainly on one side of the fabric, substantially as herein shown and described.

PARKER RICHARDSON BRADLEY.

Witnesses:
W. ORISON UNDERWOOD,
MARCUS MORTON, Jr.